Figure 1:
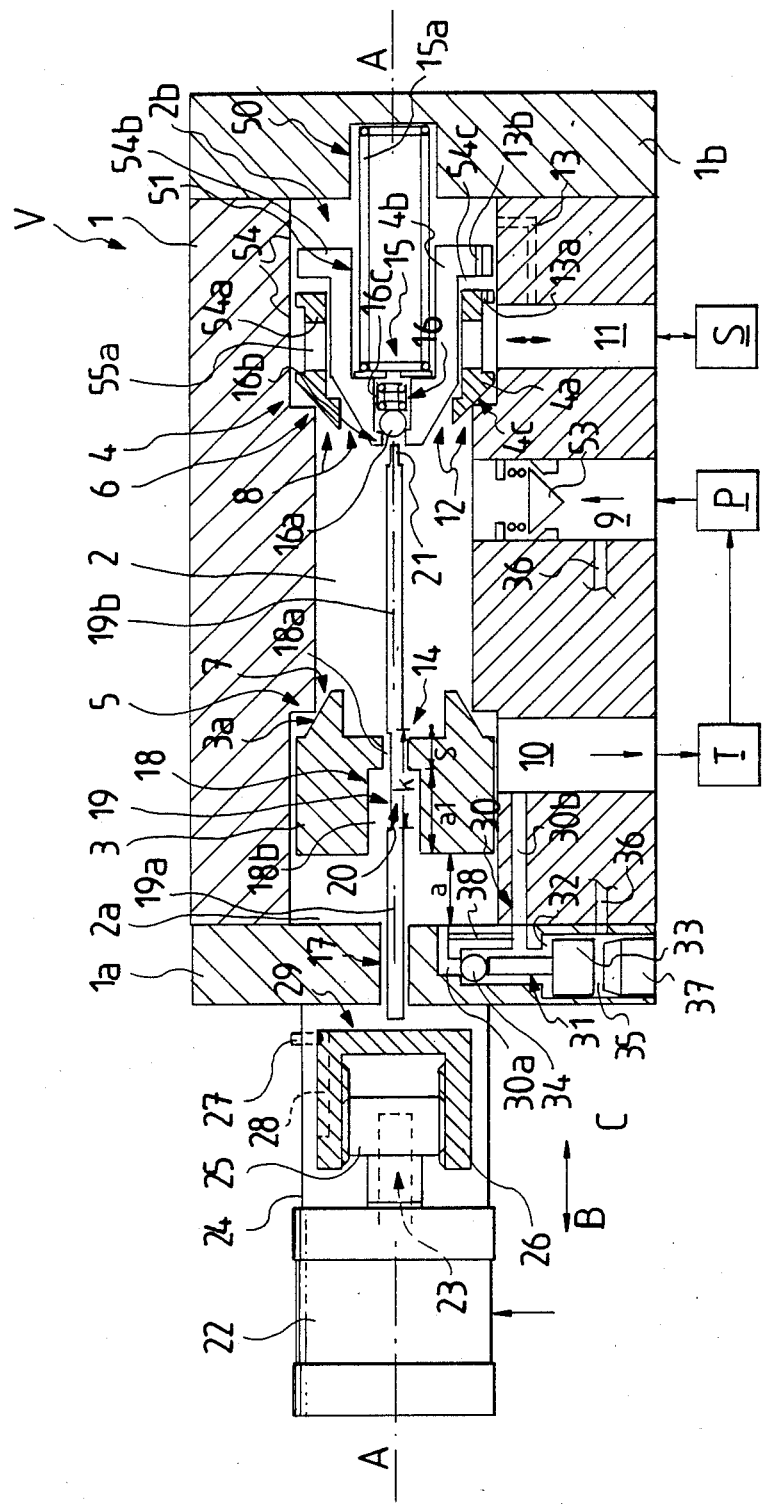

United States Patent [19]
Rita

[11] Patent Number: 4,938,119
[45] Date of Patent: Jul. 3, 1990

[54] VALVE MEANS

[76] Inventor: Pentti Rita, Poronkatu 4, SF-50190 Mikkeli, Finland

[21] Appl. No.: 246,346

[22] Filed: Sep. 19, 1988

[30] Foreign Application Priority Data

Sep. 22, 1987 [FI] Finland ................................ 874147

[51] Int. Cl.⁵ .......................................... F15B 13/043
[52] U.S. Cl. ....................................... 91/461; 91/446; 91/448; 91/459; 187/111
[58] Field of Search ................. 91/446, 448, 459, 461; 187/111; 137/864, 870

[56] References Cited

U.S. PATENT DOCUMENTS

| | | |
|---|---|---|
| 3,057,160 | 10/1962 | Russell et al. |
| 4,011,888 | 3/1977 | Whelchel et al. ........... 137/596.16 X |
| 4,153,074 | 5/1979 | Risk ................................. 91/446 X |
| 4,318,332 | 3/1982 | Shingu et al. ..................... 91/446 X |
| 4,418,794 | 12/1983 | Manco .............................. 91/448 X |
| 4,583,567 | 4/1986 | Arav . |
| 4,700,748 | 10/1987 | Fossati et al. ..................... 91/446 X |

FOREIGN PATENT DOCUMENTS

| | | |
|---|---|---|
| 1268801 | 5/1968 | Fed. Rep. of Germany . |
| 2703349 | 9/1977 | Fed. Rep. of Germany . |
| 367172 | 5/1974 | Sweden . |
| 628117 | 2/1982 | Switzerland . |
| WO 86/06359 | 11/1986 | World Int. Prop. O. . |

Primary Examiner—Gerald A. Michalsky

[57] ABSTRACT

The invention concerns a valve structure comprising a valve body, a chamber space disposed within the valve body, two running spindles and seats disposed to cooperate and placed within the chamber space, each running spindle enabling the aperture in the respective seat to be controlled. The valve structure comprises an input duct, a return duct and a working duct, the ducts being connected to the chamber space, a pressurized fluid being supplied through the input duct in the chamber space and the fluid being conducted through the controllable apertures with the aid of the running spindles either through the return duct out from the valve means to a tank or equivalent, or through the working duct to at least one power cylinder or equivalent, and the position of the running spindles and the size of the apertures being controlled with the aid of pilot valves. Through each running spindle is provided a passage connecting the back chamber space behind the running spindle with the space in front of the running spindle. In each passage is disposed pilot valves which control the differential pressure across the running spindles. At the same time the position of the running spindles and the size of the apertures are controlled, as well as the fluid flows from the chamber space to the return duct and/or to the working duct.

12 Claims, 5 Drawing Sheets

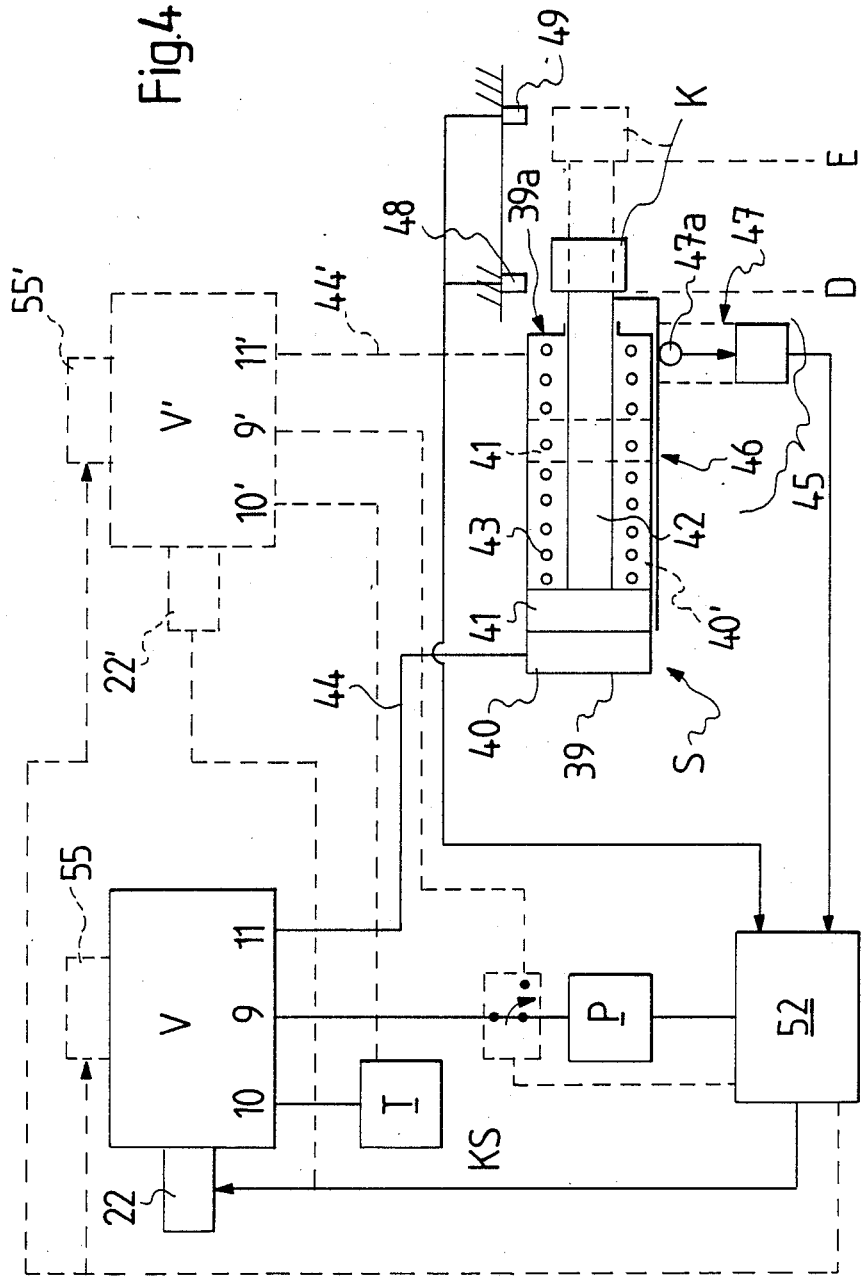

VALVE MEANS

The present invention concerns a valve means as specified in the preamble part of the independent claim.

In the course of development of hydraulic actuating means, in particular of cylinders, certain important requirements have been imposed on their operation, among which may be mentioned load-independent operating speed and load-independent, stepless acceleration and deceleration in both directions. Various kinds off valve means are used to control actuating means of this kind. The requirements placed on such a valve means, and also on the hydraulic actuating means, are particularly high when hydraulic lifts are concerned.

In the Swedish publicizing print SE No. 376,172, in the German publicizing print DE No. 1,268,801 and in U.S. Pat. No. 4,418,794 are disclosed various valve designs particularly for operating a hydraulic lift. These valve means are however complicated both structurally and functionally. They also fail to attain such functional reliability and flexibility as is necessary particularly in lift applications.

In the international patent application of the same applicant, publicized with the No. WO 86/06359, an electrically controlled valve means is disclosed. With the aid of said valve means many of the drawbacks can be avoided which have been encountered in the valve means of the above-mentioned references. However, said valve means has the drawback that during running the position of the running spindles is not known by any indication other than the flow of the pressurized fluid or the speed of the piston of the power cylinder (lifts, etc.). The lengths of the ducts carried to the throttling valves may also introduce delays in control.

The object of the present invention is among other things, to eliminate the above-mentioned drawbacks by implementing a valve means which is simple of its construction and reliable in operation. This has been achieved by the aid of those characteristic features of the invention which are presented in the claims following further below.

Significant advantages are gained in many applications with the valve means of the invention. The speed of the running spindles of the valve means and their location are accurately known. The spindles can be kept in unchanged position with the aid of an electromotor when such is required, and the valve means is not inclinded to oscillate. The design of the valve means also enables direct control. e.g. manual control, with then aid of a simple lever or linkage system. It is furthermore easy to connect to the valve means an external pilot valve, such as a magnet valve, or a coupling means which serves as back-up and as a safety-increasing factor in the event of the valve being damaged for any reason or of mains failure. Furthermore, installation of such a magnet valve or coupling means in conjunction with the valve means is simple.

It may be generally observed that control of the valve means is significantly better than in the case of the valve means disclosed in said international application, and that the ancillary apparatus affording added safety can be mounted in conjunction with the valve means with ease. In addition to the above-mentioned ease of control, it may also be observed that the control of this valve means is highly accurate. It is hereby eminently suitable for use e.g. in controlling the hydraulic actuating means of robots.

Figure 2:
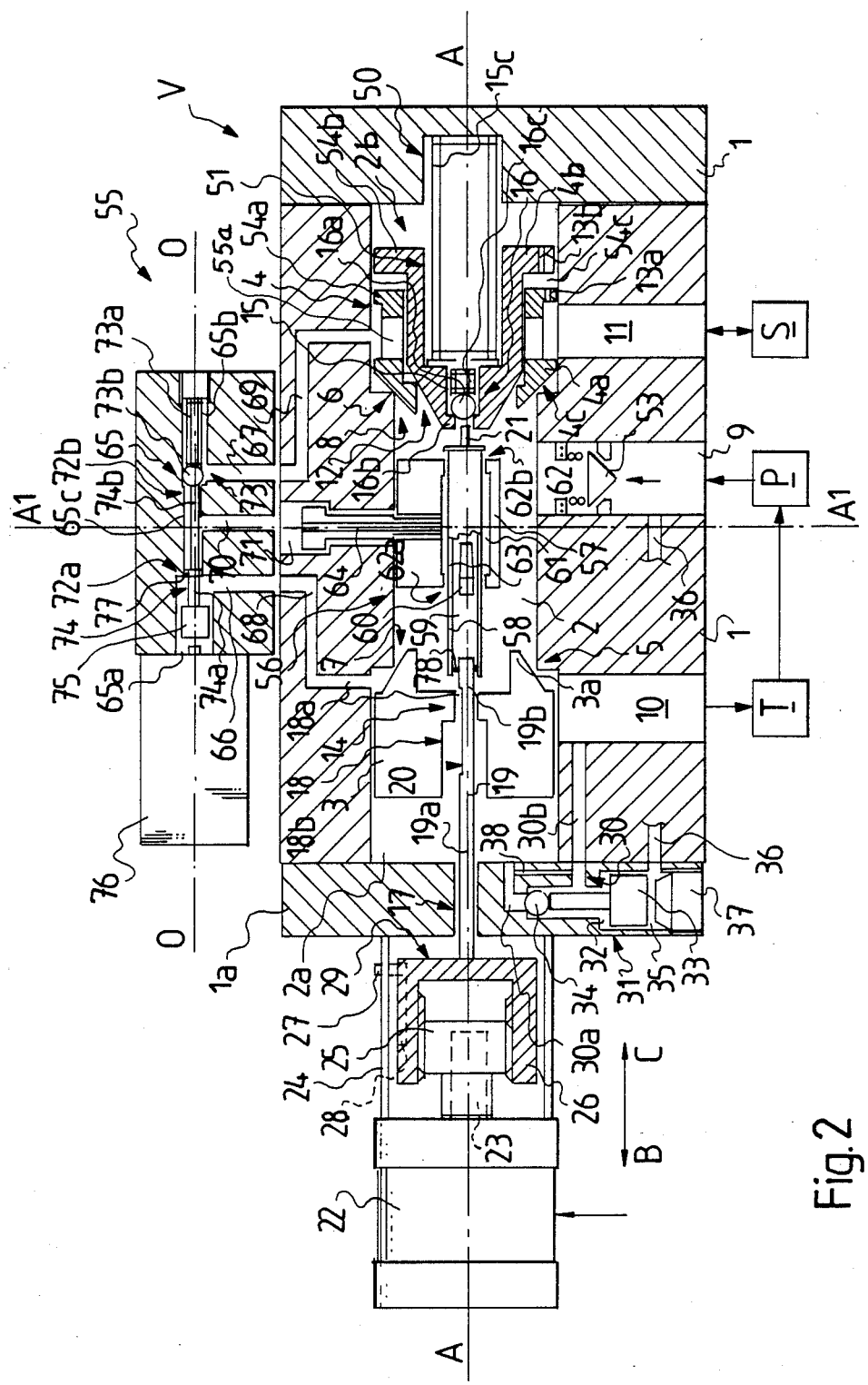
Figure 3:
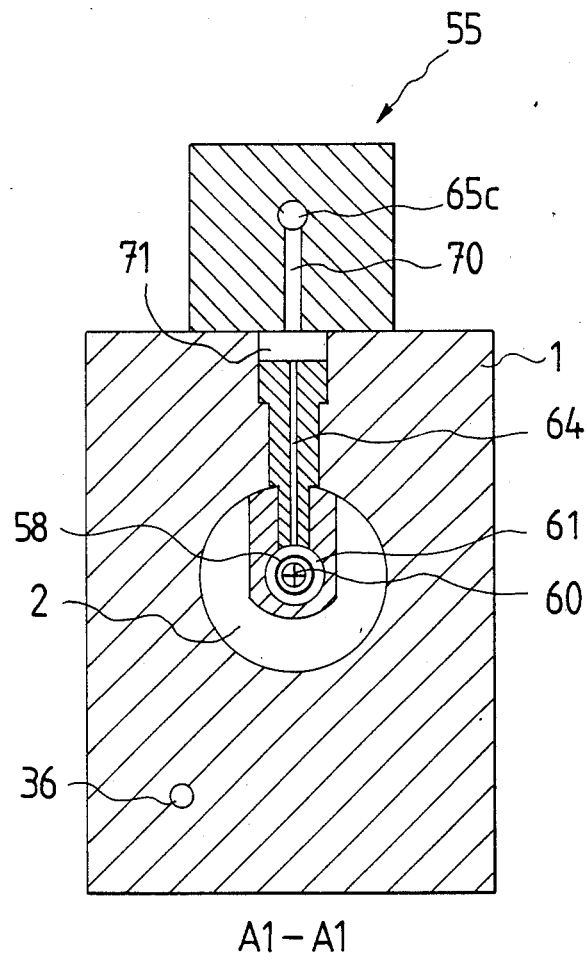
Figure 5:
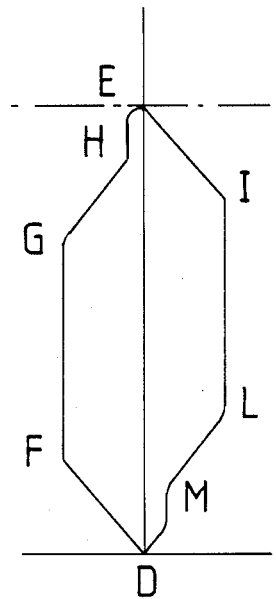
Figure 6:
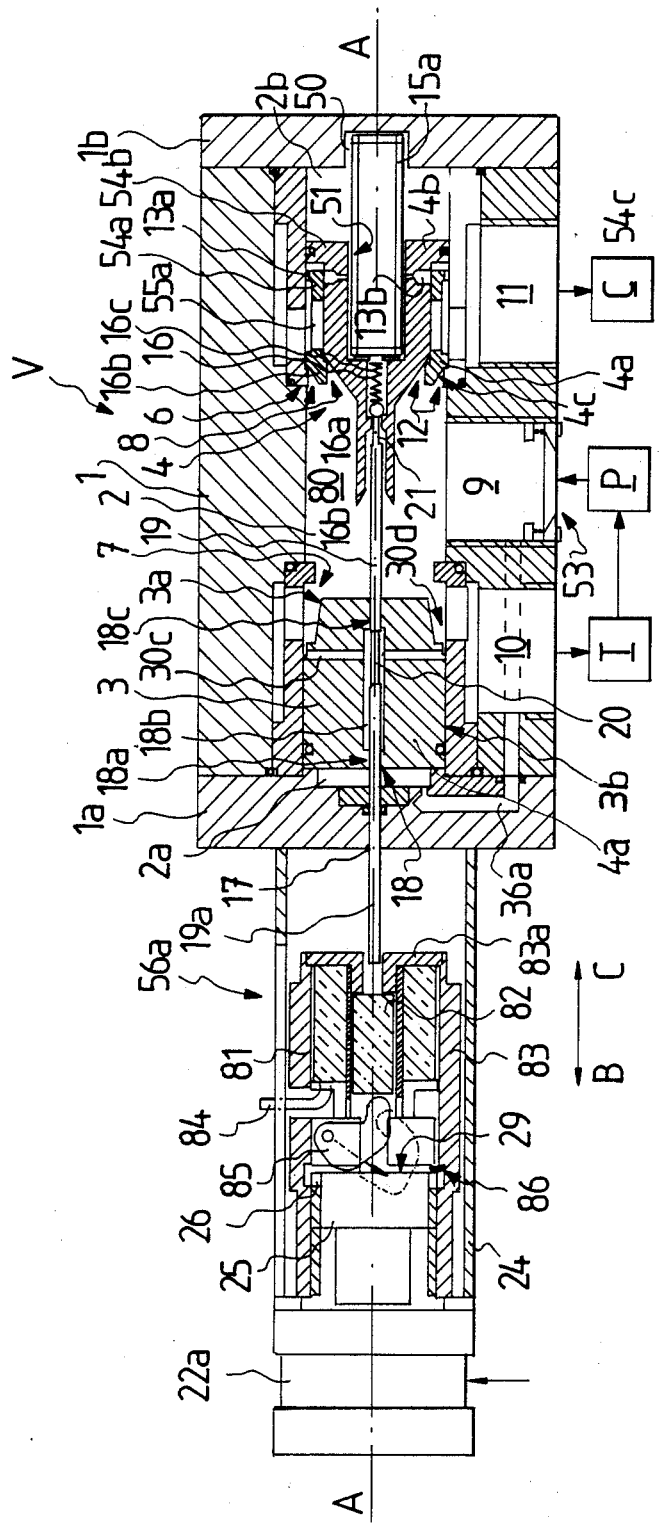

In the following, the invention is described in detail, referring to the attached drawings, in which:

FIG. 1 presents a sectional view of a valve means according to the invention;

FIG. 2 presents a sectional view of another valve means according to the invention;

FIG. 3 presents a cross section of the valve means of FIG. 2, along the line A1—A1;

FIG. 4 presents the control arrangement for the valve means, and the hydraulic cylinder operated with its aid;

FIG. 5 presents schematically the running diagram of the hydraulic cylinder;

FIG. 6 presents a cross section of a third valve means according to the invention.

The valve means comprises a valve body 1, a chamber space 2 disposed within the valve body 1, two running spindles 3,4 and seats 5,6, fitted to cooperate and to operate in the chamber space 2. Each running spindle 3,4 enables the aperture 7,8 of the respective seat 5,6 to be regulated. The valve means further comprises an input duct 9, a return duct 10 and a working duct 11, all these ducts connected with the chamber space 2. The valve means is connected with a tank T containing fluid, and with a pump P. The actuating means proper which is to be controlled, such as a cylinder S, has been connected with the valve means by the working duct 11. The pump P is connected to the tank T and further by the input duct 9 to the chamber space 2 for feeding fluid into the chamber space. The input duct 9 is fitted with a check valve 53. The chamber space 2 is connected with the tank 10 through the return duct 10. The fluid is directed with the aid of the running spindles 3,4 to go through the apertures 7,8 either by the return duct 10 to the tank P or by the working duct 11 to the power cylinder S. The positions of the running spindles 3,4, and at the same time the sizes of apertures 7,8, are controlled with the aid of pilot valves. In the embodiments of the invention depicted in FIGS. 1 and 2, the chamber space 2 is an elongated, straight and cylindrical space which has in its central part a somewhat smaller diameter than in its end portions. Said running spindles 3,4 have been disposed in the opposed end portions of the space 2 in such manner that they can be moved in the direction of the axis A—A of the chamber space. Said seats 5,6 are then located between the central part and the end portions of the chamber space 2.

The first running spindle 3 has been formed of a cylindrical body, of which the end facing the seat 5 has advantageously been bevelled to be conical. When the spindle 3 is in its closed position, its conical end 3a rests against the seat 5 and the communication between the chamber 2 and the return duct 10, or the aperture 7 in the seat 5, is closed. When the spindle 3 is in the fully open position, it is displaced towards the first end of the chamber 2 at least far enough to leave the aperture 7 and the return duct 10 fully open. The part of the chamber 2 defined between the spindle 3 and the first end of the chamber 2, or the first end plate 1a of the body 1, is in the following called the first back chamber space 2a. This space 2a is at its largest when the spindle 3 is in its closed position, and it is smallest when the spindle 3 is in the open position.

The second running spindle 4 has also been formed of a cylindrical body like the first running spindle 3, and its end 4c facing the seat 6 is advantageously likewise conically bevelled. When the spindle 4 is in its closed position, its conical end rests against the seat 6, and the communication between the chamber 2 and the working duct 11, i.e., the aperture 8 in the seat 6, is closed. When the spindle 4 is in its fully open position, it is displaced towards the second end of the chamber 2, i.e., towards the second end plate 1b of the body 1, at least so far that the aperture 8 and the working duct 11 are fully open. The part of the chamber defined between the spindle 4 and the second end of the chamber 2, or the second end plate 1b of the body 1, is in the following called the second back chamber space 2b. This space 2b is at its largest when the spindle 4 is in its closed position, and it is smallest when the spindle 4 is in the open position. In the embodiment examples of the invention depicted in FIGS. 1 and 2, the second running spindle 4 has been formed of two spindle units 4a, 4b fitted one into the other. The first spindle unit 4a has been fitted into the aperture 8 in the seat 6, and the second unit 4b, into a smaller aperture 12 provided in conjunction with the first spindle unit 4a, advantageously in its centre. Alternatively, a running spindle like the first running spindle 3, formed of one single piece, may be used for the second running spindle 4.

Through each running spindle 3,4 a passage 18,15 has been provided, which connects the back chamber space 2a, 2b behind the running spindle 3,4 with the space in front of the running spindle 3,4, such as the chamber space 2. In each passage 18,15 a pilot valve 14,16 has been provided, enabling the differential pressure across the running spindles 3,4 to be controlled and, at the same time, enabling control of the position of the running spindles 3,4 and size of the apertures 7,8, and of the fluid flows from the chamber space 2 to the return duct 10 and/or the working duct 11.

The working duct 11 connects by passages 13a, 13b with the back chamber space 2b. The passages 13a, 13b are advantageously disposed in the first spindle unit of the second running spindle 4a and similarly in the second spindle unit 4b. Advantageously, the passage 13a in the first spindle unit 4a has a larger cross section area than the passage 13b in the second spindle unit. If the second running spindle 4 is similar to the first 3, a continuous passage may be provided therethrough, or this passage 13 may be disposed to run through the body 1 from the back chamber space 2b to the working duct 11, as has been indicated with interrupted lines in the drawings.

Between the second running spindle 4 and the body 1, i.e., the second end plate 1b of the body, has been placed a spring 14 within the back chamber space 2b. The first end of said spring 14 has been disposed in a recess 50 in the body end plate 1a and the second end, in a recess 51 of the running spindle 4 or the running spindle unit 4b. The task of this spring is to return the unitary running spindle 4, or the spindle units 4a, 4b of the running spindle 4, to lie against each other and against the seat 6 when the flow going through the aperture 8 and 12 is reduced.

Through the running spindle 4, in this case through the spindle unit 4b, has been provided a passage 15 in which a second pilot valve 16 has been disposed. This comprises a closing member 16a, such as a ball, a seat 16b, and a spring 16c. The seat 16b is located in the passage 15 at the end towards the chamber space 2. The ball 16a rests, urged by the spring 16c, against the seat 16b, thereby closing the passage 15. With the aid of the valve 16, the pressurized fluid flow through the passage 15 from the working duct 11 through the back chamber space 2b to the chamber space 2 is both inhibited and controlled.

Through the body 1 of the valve means, in the present case through the first end plate 1a of the body 1, an aperture 17 has been provided from the first back chamber space 2a to the outside of the body 1, and further through the first running spindle 3 at the equivalent location another aperture 18, in which the first pilot valve 14 has been disposed. The apertures 17,18 are most advantageously parallel with the axis A—A of the chamber space 2. In the apertures 17,18 is disposed a rod 19, its first end 19a or an extension thereof extend to the outside of the body 1 and the other end 19b extending through the running spindle 3 into the chamber 2. The rod 19 has been disposed in the apertures 17,18 in such a way that it can be moved in the direction of the axis A—A, yet so that no pressurized fluid can leak past it, at least not through the aperture 17 to the outside of the body.

On the rod 19 has been provided, in its longitudinal direction, at least one region 20 at which the cross section area of the rod 19 is smaller than that of the aperture 18 in the running spindle, and said rod 19, said region 20 and said aperture 18 constituting said pilot valve 14 of the first running spindle 3. This region may for instance be a groove, a notch or a narrow portion 20, at which the cross section area of the rod 19 is smaller than the cross section area of the rod at the other end. When the narrow portion 20 of the rod and the aperture 18 in the running spindle 3 are in register, a communication will be open between the chamber 2 and the first back chamber space 2a; this communication will henceforward be called the passage 18.

The pilot valve 14 of the first running spindle 3 and the pilot valve 16 of the second running spindle 4 can be coupled by means of a mechanical coupling means, by mediation of which both valves can be controlled with one actuating means.

In the embodiment example of the invention depicted in FIG. 1, the rod 19 serves as mechanical coupling means, particularly the second end 19a of this rod, which extends through the chamber 2 in the direction of the axis A—A up to the vicinity of the second running spindle 4, in particular of the valve 16. The end 19b of the rod is suitable shaped to present a projection, or it is provided with a pin 21 or similar projection by the aid of which, when the rod 19 is moved, pressure is exerted on the closing member of the pilot valve 16, such as a ball 16a, when one desires to open the passage 15.

The rod 19 can be displaced with a separate actuating means, which may be a mechanical lever, an electrical, electromagnetic or other equivalent means. In the embodiment of the invention depicted in the drawings, the actuating means is an electromotor 22. The electromotor 22 has been mounted with a fixing element 24 on the valve body 1, in this case on the first end plate 1a. The shaft 23 of the electromotor 22 is connected to a screw or equivalent member by which a nut 26 or equivalent component is operated. The nut 26 is prevented from turning along with the rotation of the screw 26, by a pin 27 or by an equivalent member. The pin is, for instance fixed on a fixing element 24 and fitted into a groove 28 in the surface of the nut 26, this groove parallelling the axis A—A and, at the same time, the shaft 23 of the electromotor. The nut 26 may be provided with a suitable end piece or end face 29.

When the electromotor is operated, its shaft 23 and the screw 25 on the shaft rotate, whereby the nut 26 moves, depending on the direction of rotation, in the direction B or C in the direction of movement of the running spindle 3,4, i.e., in the present case in the direction of the axis A—A, and it becomes possible to exert an influence with the end piece 29 or equivalent on the rod 19, that is on its first end 19a. The electromotor is so attached to the body 1 that the end piece 29 of the nut 26 faces the rod 19; in the embodiment examples of the drawings the shaft 23 of the electromotor, the screw 25 on this shaft and the nut 26, and the end piece 29 of the nut, lie on the same principal axis A—A with the rod 19.

The aperture 18 through the first running spindle has been implemented in the embodiment example of FIG. 1 in such a way that it consists of two parts 18a and 18b. The first part 18a of the aperture has a cross section approximately of the size of the cross section of the second end 19b of the rod. The other aperture 18b has a cross section clearly larger than that of the first aperture 18a. The depth a1 of the second aperture in the direction of the axis A—A is in this case more than half the thickness of the spindle. In principle, the depths of the narrow aperture 18a and of the wide aperture 18b are freely selectable, and they are, of course, dependent on the diameter of the running spindle in the direction of the axis A—A. However, the length k of the reduced part 20 of the rod depends on the diameter of the running spindle 3, and thus on the depth of the wide aperture 18b. The reduced part 20 of the rod has a length k at least equal to the travel of the first running spindle 3 from its open position to the closed position or vice versa. In the closed position, the running spindle 3 rests against the seat 5, and then in the initial situation the second end 19b of the rod 19 also closes the aperture 18. In this situation, the length k of the reduced part 20 minus the depth s of the narrow aperture 18a has to be greater than the depth a of the back chamber. This makes sure that the running spindle 3 operates within the range of the reduced portion of the rod at all times.

The back chamber space 2a of the first running spindle 3 is connected by a passage 30a, 30b with the return duct 10 going to the tank T. In the passage 30 a valve 31 has been provided. The valve 31 comprises a valve space 32 and disposed therein, a movable piston-like member 33, and a closing member, such as a ball 34, or an equivalent member which has been disposed on the end of the piston-like member 33 and by which the passage 30 can be closed. The space 35 behind the piston-like member 33 is advantageously connected by another passage 36 either with the chamber space 2 or with the pump connection, that is, directly with the input duct 9. The valve space 32 is closed e.g. with a threaded, openable plug 37. A by-pass passage 38 has been provided past the valve 32, its cross section being smaller than that of the passage 30.

FIG. 4 illustrates the way in which the valve means is connected to the actual actuating means to be operated, such as a hydraulic cylinder S, with the aid of which the load K can be transported e.g. from D to E, this load being for instance a lift cage, a lifting platform or equivalent which can be lifted from one level or floor to another, and correspondingly lowered. The hydraulic cylinder S may be a single-action cylinder, as has been shown in FIG. 4, or any equivalent hydraulic or pneumatic actuating means in which the operation of the means is controlled with the aid of fluid pressure.

The hydraulic cylinder S comprises a cylinder shell 39 defining within itself the cylinder space proper 40, the working duct 11 of the valve means being connected thereto with a duct 44, which may for instance be a length of hydraulic tubing or equivalent.

In the cylinder space 40 a piston 41 has been provided. Between the piston 41 and the end shell 39a of the cylinder a spring 43 has been inserted. The piston rod 42 is an elongated member which extends, or the extension of which extends, to the outside of the cylinder space 40. The piston rod is appropriately connected with the load K on which the hydraulic cylinder S is meant to act.

In conjunction with the hydraulic cylinder S a sensor 45 is provided with the aid of which the movements and speeds of movement of the piston 41, the piston rod 42 and the load K are monitored. In the present case the sensor 45 has been composed of a rod 46 and a pulse transmitter 47. The rod 46 has been arranged to move together with the piston rod 42 of the cylinder. The pulse transmitter 47 comprises a round disk 47a which is rotated by the rod 46 moving along with the piston rod 42. The rotation of the disk 47a is measured e.g. by electro-optical means, and the information is carried to the control unit 52 of the valve means.

It is advantageous to provide also limit switches 48 and 49 in conjunction with the hydraulic cylinder S, with the aid of which e.g. those extreme points of the motion range are watched which the piston rod 42, and in particular the load K, must not transgress. The limit switches 48,49 are also connected to the control unit 52. It is also possible to use other kinds of switches or sensors in addition to the limit switches 48,49, which monitor the condition of the cylinder S and/or the position of the load K loading the piston rod 42, or which are used to move the load into a given position.

In conjunction with the valve means, indicated with the reference symbol V in FIG. 4, and with the hydraulic cylinder S has been provided a control unit 52. The supervising instruments associated with the hydraulic cylinder S, such as 45,48,49 or equivalent, are connected to the control unit 52. The pump P and the electromotor 22 of the valve means V and/or equivalent actuating means governed by the valve means are also connected to the control unit 52. With the aid of the control unit 52 the valve means V is controlled, and with the aid thereof the operation of the hydraulic cylinder S is controlled.

The apparatus depicted in FIG. 4 operates as follows when a valve means as in FIG. 1 is used for valve means V. In this description the speed diagram of the hydraulic cylinder reproduced in FIG. 5 is used as aid. To begin with, the load K connected with the hydraulic cylinder S is in position D, and the intention is to move it into position E. The first running spindle 3 of the valve means is then in its closed position. The electromotor 22 and the nut 26 therewith connected are in the Home position, but the rod 19 in FIG. 1 is free between the end face 29 of the nut 26 and the closing member 16a of the valve 16. The second running spindle 4, or the combination of running spindle units 4a and 4b, is in the closing position. When transport of the load K from D towards E is commenced, the pump P is started. The pressurized fluid pushes open the check valve 53 in the input duct 9. The pressure in the chamber space 2 increases because all ducts leading out from there are closed. The lifting pressure in the input duct 9 acts through the passage 36 on the valve 31. The pressure acts on the space 35 behind the piston and pushes the piston 33 of the valve so that the closing member 34 closes the passage 30. The pressure acting in the chamber space 2 tends to push the first running spindle 3 towards the back space 2a, whereby the pressure also begins to increase in said back chamber space 2a. The electromotor is started with the aid of the control unit 52 so that the nut 26 begins to move in the direction C and pushes the rod 19 in the same direction until the passage 18, in particular 18a, between the reduced part 20 of the rod and the first running spindle 3 opens. As a consequence, the liquid pressure begins to increase in the back chamber space 2a, and it pushes the running spindle 3 towards the seat 3 and the chamber space 2. The first running spindle 3 closes the aperture 7 in the seat and the return duct 10 to the tank T.

With the pump still operating, the pressure increases in the chamber space 2. When the pressure has increased to be high enough, that is when it overcomes the spring force of the spring 15a, the second running spindle 4, or the combination of running spindle units 4a and 4b, begins to open, that is to move in the direction C, and the pressurized fluid is admitted into the cylinder S through the aperture 8 in the seat and through the working duct 11. The pressurized fluid goes further from the working duct 11 through the passage 44 to the space 40 of the cylinder S and begins to push the piston 41 and piston rod 42, together with the load K thereto attached.

With the aid of the control unit 52 it is checked at the same time whether the piston 41 of the cylinder S with its attached apparatus has started to move. When the first motion pulse is received from the pulse transmitter 47, acceleration of the piston 41 is commenced. If at the beginning motion pulses arrive in a sequence faster than is permissible, the electromotor 22 is started so that the nut 26 associated with it begins to move in the direction B, as will also the rod 19. The passage 18 is then at least partially closed and the flow through this passage is reduced, resulting in slow discharge of the pressure in the back chamber space 2a through the by-pass passage 38 and the duct 30 to the return duct 10. The running spindle 3 will then move in the direction B, and the aperture 7 of the seat opens and offers a by-pass path to the pressurized fluid, from the chamber space 2 to the return duct 10. As a result, the spring 15a urges the second running spindle 4 towards the initial position, whereby the aperture 8 of the second seat is reduced and the transfer of pressurized fluid from the chamber space 2 by the working duct 11 further to the cylinder space 40 slows down. The consequence is smooth and controlled starting and initial acceleration of the piston 41 of cylinder S and of the equipment therewith connected, in the interval D to F in FIG. 5. When the desired travelling speed of the piston 41 has been reached, which is observed with the pulse transmitter 47, the operation shifts in to constant speed mode, that is, the electromotor 22 and nut 26, and the rod 10 governed thereby, are stopped with the aid of the control unit in a given position; the passage 18 is at least partly open, whereby the pressure in the back chamber space is constant and part of the pressurized fluid is admitted from the chamber space 2 through the passages 18, 30a, 38, 30b and duct 10 to the tank T. The distance from F to G in FIG. 5 is traversed at constant speed.

When the piston 41 of the hydraulic cylinder S together with its associated equipment has been moved through the desired distance, a signals is received from the limit switch 49 and/or the pulse transmitter 47, this signal being interpreted in the control unit 52 to signify commencement of deceleration at the point G in FIG. 5. The nut 26 is then moved with the aid of the electromotor 22 in the direction B, whereby the rod 19 also moves in the direction B under by effect of fluid pressure. The passage 18 then closes, and the pressure begins to urge the first running spindle 3 in the direction B. The pressure increases in the back chamber space 2a, but it is discharged through the passages 30a, 38 and 30b to the return duct 10 and further to the tank T. Thus the first running spindle 3 also begins to move in the direction B and the aperture 7 in the seat opens. The pressure in the chamber space 2 begins to discharge through the aperture 7 into the return duct 10 and further to the tank T. When the pressure in the chamber space 2 thus decreases, the spring 15a together with the pressure present in the back chamber space 2b urges the second running spindle 4 towards the closed position, whereby the aperture of the seat 8 is reduced, and at the same time the influence of pressure in the space 40 of the hydraulic cylinder S becomes less and the speed of movement of the piston 41 becomes less. This is continued until the speed of the piston 41 and of its associated equipment reaches a given limit, i.e., the point H in FIG. 5, from which onward the piston 41 is run forward at a suitable constant creeping speed until the control unit 52 concludes, on the basis of the signal received from the pulse transmitter, that the desired point E has been reached.

Information concerning the position of the piston 41 of the hydraulic cylinder S and of the equipment therewith associated is obtained with an accuracy of at least 0.5 mm. The limit information D,E concerning the desired positions is obtained e.g. from limit switches 48,49, and/or they are calculated in the control unit 52 from the pulse counts received from the pulse transmitter 47.

When the piston 41 of the hydraulic cylinder S has reached the desired point E in FIG. 5, the pump P is stopped and the nut 26 of the electromotor 22 is moved to the Home position, or initial position. This causes the passage 18 in conjunction with the first running spindle 3 to close, and at the same time the running spindle 3 closes the possibly partly open seat aperture 7, that is, the running spindle goes into the closing position. At the same time, as the pressure goes down in the chamber space 2, the spring 15a urges the second running spindle 4 into the closing position, whereby the seat aperture between the chamber space 2 and the working duct 11 is closed. The working duct 11 and the space 40 of the hydraulic cylinder S remain pressurized.

The pressure present in the space 40 of the hydraulic cylinder S, in the passage 44, in the working duct 11 and in the annular passage 55a goes by the duct 13; 13a, 13b to the back chamber space 2b. The differential pressure between the back pressure chamber space 2b and the chamber space 2 also acts on the second running spindle 4 and pushes it into closed position.

The operation by which the piston 41 of the hydraulic cylinder S and the equipment thereto attached are returned from point E to point D is as follows. Starting the return travel is similar to the start of travel described above; but the pump P is not started, instead of which the counter-spring 15a controls the position of the second running spindle 4, together with the valve 16. The electromotor 22 and rod 19 are again in their initial position, that is, in the same position in which they were at the start of travel from point E. During the return run, the pressure in the back chamber space 2b of the running spindle 4 is the same as in the working duct 11, and thus the same as in the space 40 of the cylinder S. The pressure in the back chamber space 2b is higher than the pressure in the chamber space 2 at rest. At the beginning of return travel, the electromotor 22 is started from the control unit 22 so that the electromotor begins to move the nut 26 in the direction C. The passage 18 opens and pressurized fluid begins to flow from the chamber space 2 through the passage 18 into the back space 2a, and further through passages 30a, 38, 30b and through the return duct 10 to the tank T. However, the nut 26, and with its aid the rod 19, is moved so far in the direction C that it becomes possible to press against the closing member 16a of the valve 16 in the second running spindle 4 with the pin 21 on the end 19b of the rod. This causes the passage 15 to open, and the pressure in the back chamber space 2b of the second running spindle 4 decreases because the pressurized fluid can now discharge from this space through the passage 15 into the chamber space 2. The pressure present in the space 40 of the hydraulic cylinder S and in passage 44 and duct 11 acts through the annular passage 55a on the flange 54 of the second running spindle 4 or on the flange 54a of the running spindle unit 4a. When the pressure in the back space 2b goes down through the passage 15, the over-pressure in the working duct 11 and in the annular passage 55a pushes the second running spindle 4, or both running spindle unit 4a, 4b in the direction C, in other words, the pressure tends to open the aperture 8,12 between the working duct 11 and the chamber space 2.

The passage 13a in the running spindle unit 4a has a cross section larger than the corresponding passage 13b in the running spindle unit 4b. The pressure in the intermediate space 54c is then higher than the pressure in the back chamber space 2b, but lower than the pressure in the annular passage 55a and in the working duct 11. Therefore the pressure in the intermediate space 54c begins to move the running spindle unit 4b of the second running spindle 4 apart from the running spindle unit 4a, i.e., in the direction chamber space, whereby the aperture 12 between the running spindle units 4a,4b opens and pressurized fluid begins to flow from the cylinder S through the working duct 11 and the aperture 12 into the chamber space 2 and further to the tank T. The acceleration of the piston 41 of the hydraulic cylinder S and of the associated equipment, E to I in FIG. 5, is regulated to be appropriate with the aid of the control unit 52, once again on the basis of the pulses delivered by the pulse transmitter 47, until the desired speed of movement of the piston 41 has been attained at the point I in FIG. 5, and the equipment is run at this constant speed up to the point L.

Designing the second running spindle 4 to consist of two running spindle units 4a, 4b entails the advantage that excellent controllability of the system is achieved: the start in the return direction is smooth. If for any reason the valve 16 closes (due to error in the control unit, to break-down of the electromotor 22, etc.), the pressure in the back chamber space 2b running spindle unit 4b begins to move up against the first spindle unit 4a. However, this takes place in controlled manner because there is pressurized fluid in the interspace 54c of the spindle unit 4a and 4b, which can discharge at least through the passages 13a, both into the back chamber space 2b and into the working duct 11. It should be noted that when the piston 41 of the hydraulic cylinder and the associated equipment are moved from position D to position E, the running spindle units 4a, 4b operate as a single entity.

When in the return motion of the piston 41 of the hydraulic cylinder S the position L in FIG. 5 has been reached, this is observed e.g. with the aid of the limit switch 48 which gives a signal to the control unit 52. The control unit again starts the electromotor 22, and the nut 26 thereof is moved in the direction B in FIG. 1. The spring 16c of the valve 16 then exerts pressure against the closing member 16a in the direction against the seat and the passage 15 begins to close. The differential pressure between the back chamber space 2b and the chamber space 2 increases, whereby the spindle unit 4b moves in the direction B and the aperture 12 associated with the working duct 11 and the annular passage 55a becomes smaller, and at the same time the flow from the working duct to the chamber space 2 becomes less. The electromotor 22 and the nut 26 are so controlled with the control unit 52 that the pin 21 on the rod 19 closes the passage in controlled manner, with the aid of the valve 16. The speed at which the piston 41 of the cylinder S moves will therefore decrease in controlled manner in the interval from L to M in FIG. 5. At the point M the electric motor 22 is stopped and running the piston 41 of the hydraulic cylinder S to the starting position D is continued at a slow constant speed, i.e., the flow from the working duct 11 to the chamber space 2 is constant.

At the same time, the pulse transmitter 47 is used in aid of measuring the movement of the piston 41 and of its associated equipment, and the position is calculated with the control means 52. When the piston 41 has reached the point D, the control unit starts the motor 22, and the nut is positioned in the initial position, whereby the rod 19 moves in the direction B, the valve 16 closes and the pressure in the space 40 of the hydraulic cylinder and in passage 44 and duct 11, and in the back chamber space 2b, pushes the second running spindle 4; 4a, 4b into its closed position. The movement of the piston 41 of the hydraulic cylinder S will then stop exactly at the desired point.

In FIG. 2 is depicted another embodiment of the valve means of the invention. In this case an external pilot valve 55 has been installed in conjunction with the valve means P, and a controllable coupling means 56 has been disposed between the running spindles 3,4 in the chamber space 7. The coupling means 56 is here a member which can be connected in the direction of the rod 19 and to constitute an extension of the rod 19. The coupling means 56 is advantageously operated with the aid of a pilot valve 55 and making use of the pressures of the fluid conducted into the cylinder S or equivalent.

The controllable coupling means 56 consists, in the embodiment example here presented, of a body 57 and a sleeve 58 or equivalent member which is an elongated rod provided, partially at least, with an axial cavity 59. The sleeve 58 is disposed in the body 57 parallel with the passages 18,15 in the running spindles 3,4; in the present instance parallelling the axis A—A of the chamber space 2. In connection with the sleeve 58 is provided a piston 60, or an equivalent member. The sleeve 58 and the piston 60 are axially movable relative to each other. In the body 57 a cavity 61 is provided and on its opposite side in the direction of the passages 18,15 and of the axis A—A, apertures 62a and 62b, through which the sleeve 58 has been disposed so that it can be moved therein. The cavity 61 is connected by at least one aperture 63 with the interior of the sleeve 58. The cavity 61 is further with a passage 64 connected with the external pilot valve 55, by the aid of which it is further connectable either with the working duct 11 and cylinder S or with the return duct 10 and tank T.

The external pilot valve 55 comprises a valve chamber 65, which has been divided into three parts: a first end chamber 65a, a second end chamber 65b and an intermediate chamber 65c. The first and second end chambers 65a and 65b are connected by passages 66 and 67 with the passages 68 and 69, respectively, of the valve means V. The passages 68 and 69 are connected at one end to the return duct 10, respectively to the working duct 11. Alternatively, the end chambers 65a and 65b and/or the passages 66 and 67 may also be connected directly with the tank T and cylinder S or with passages external to the valve means V which communicate with them. The intermediate chamber 65c is connected by a passage 70 with the passage 71 of the valve means v, this latter passage leading to the passage 64 which leads to the controllable mechanical coupling means 56.

The intermediate chamber 65c has advantageously a cross section smaller than those of the end chambers 65a and 65b. In the second end chamber 65b is disposed a check valve 73, consisting of a shoulder 72b, a spring 73a and a closing member 73b, such as a ball for instance. The ball 73b rests against the shoulder 72b, being loaded by the spring 73a, whereby it closes the aperture between the end chamber 65b and the intermediate chamber 65c. In the first end chamber 65a and the intermediate chamber 65c has been disposed a rod-like member 74. The first end 74a of the rod-like member 74 extends up to the closing member 73b of said check valve. On the other end of the rod-like member is provided a soft iron piece 75 which can be acted upon with the aid of an electromagnet 76; in the embodiment example depicted in FIG. 2 the soft iron piece 75 and the rod-like member 74 are pushed in the direction 0—0 of the chambers when the electromagnet 76 is energized. On the rod-like member 74, on the side of the first end chamber 65a, has been fitted a closing member, such as an expanded part, with the aid of which the aperture between the first end chamber 65a and the intermediate chamber 65c can be closed.

The external pilot valve 55 and the controllable mechanical coupling means 56 operate as follows. The valve means V operates in the embodiment example of FIG. 2 in principle fully like the valve means of FIG. 1, and in the description of the operation of the pilot valve means 55 and of the mechanical coupling means 56 reference is made to FIGS. 4 and 5 and to the above operational description of the valve means.

When in the arrangement of FIG. 4 one begins to move the piston 41 of the hydraulic cylinder S from the point D towards E and when the pressure has increased to be high enough, i.e., to such height that it overcomes the spring force of the spring 15a of the second running spindle 4 in the back chamber space 2b, the running spindle 4 begins to open and the pressure fluid is admitted into the cylinder S through the seat aperture 8 and the working duct 11. From the duct 11, the pressurized fluid spreads through the annular passage 55a further to the passage 69 and thence to the passage 67 of the external pilot valve, and to the second end chamber 65b. If the check valve 73 has not closed earlier already with the aid of the spring 73a, the closing member 73b will now under pressure effect close the path between the second end chamber 65b and the intermediate chamber 65c. At the same time the closing member 73b pushes the rod-like member 74 with its associated elements towards the electromagnet 76, whereby the closing member 77, which has heretofore closed the aperture between the first end chamber 65a and the intermediate chamber 65c, also moves in the same direction and communication is established from the intermediate chamber 65c to the first end chamber 65a. The piston 60 of the controllable coupling means 56 will then move under effect of the pressure prevailing in the chamber space 2 in the direction C because the cavity 59 behind the piston 60 communicates by the aperture 63, the cavity 61, the passage 64, the passage 74 and by the passage 70 of the pilot valve 55, the intermediate chamber 65c, the end chamber 65a and the passage 66 further with the passage 68 of the valve means and with the return duct 10.

When the piston 41 of the hydraulic cylinder S with its associated equipment is moved from E back to D, the pilot valve 55 is activated from the control unit 52, i.e., the electromagnet 76 is connected to a suitable current source. This causes the soft iron piece 75 and the elements therewith associated, such as the rod-like member 74, to move away from the electromagnet 76. Hereby the aperture between the first end chamber 65a and the intermediate chamber 65c is closed with the aid of the closing member 77, while the other end 74b of the rod-like member 74 pushes against the closing member 73b of the check valve 73 so that the aperture between the intermediate chamber 65c and the second end chamber 65b opens. The fluid pressure is then admitted from the space 40 of the cylinder S through the passages 44,11, 55,69,67 to act in the second end chamber 65b and further through the intermediate chamber 65c into the passages 70,71,64, the cavity 61, and through the aperture 63 into the cavity 59 on the right-hand side of the piston 60 in FIG. 2. The piston 60 moves under pressure effect to the left end of the sleeve, against suitable stops 78 provided close to this end. The rod 19 is shorter in the embodiment example of FIG. 2 than in that of FIG. 1. The second end 19b of the rod 19 extends advantageously, at rest, to some distance inside the sleeve 58. When the piston is urged by pressure effect to the end of the sleeve 58, as has just been described, it meets the second end 19b of the rod 19, and thereby the coupling means 56 is operative. The rod 19 and sleeve 58 and the pin 21 provided on the end of the sleeve 58 then constitute together an entity which operates similarly as the rod 19 and the pin 21 on its end which were described in connection with FIG. 1.

The piston 41 of the cylinder S and the load K may for some reason stop while the run is unfinished. In that case the control unit 52 returns the electromotor 22 and the nut 26 to their initial positions, that is to the condition at the point D where the operation started (FIG. 5). At the same time the mechanical coupling means 8 or 56 also cease to act on the valve 16, and the hydraulic cylinder S comes to a standstill. Usually the electromotor 22 has to be returned to its initial position manually under control by the control unit 52.

A separate alarm switch can be connected to the control unit 52. With its aid the electromotor 22 and the nut 26 are directed into a predetermined position in which the rod 19 or the coupling means 56 and pin 21 press on the closing member 16a of the valve 16 in such manner that the passage 15 opens slightly. The pressure in the cylinder S will then go down and the piston 41 and load K will move slowly towards the initial position D, and such movement continues as long as the alarm switch is pressed.

In the event of mains failure the electromagnet 76 of the external pilot valve 55 releases its armature and the check valve 73 closes, and the closing member 77 moves out from between the intermediate chamber 65c and the first end chamber 65a. When this occurs, the piston 60 of the coupling means 56 moves in the direction B of the sleeve because the pressure in the sleeve becomes less as it comes into communication with the tank T e.g. through the passages 64,71,70,65c,65a,66,68 and the duct 10. At the same time the pin 21 ceases to press against the closing member 16a of the valve 16, and the passage 15 is closed. The pressure in the space 40 of the cylinder S becomes constant and the movement of its piston 41 and of the load K stops. It is thus understood that mains failure merely stops the cylinder S and no serious things can happen. This is particularly important in hydraulic lifting apparatus and, for instance, in lift applications, i.e., when the load K is a lift cage; in such instances the spring 43 in the cylinder is most often replaced with gravity. The pilot valve 55 operates in the way described also when, for instance, the electromotor 22 is damaged or the control unit 52 fails.

In FIG. 6 is presented a third embodiment example of the valve means of the invention. This valve means is similar in its basic structural design to the valve means depicted in FIG. 1. Therefore the same reference numerals are used for identical components of the valve means. The following is a discussion of the differences which exist between these different embodiment examples of the invention.

In the valve means of FIG. 6 the passage or aperture 18 has been composed of three partial passages 18a, 18b and 18c. The passage in the middle, that is the passage 18b, is located in the central part of the running spindle 3 and has a cross section area greater than those of the first and third passages 18a, 18c. The first and third passages 18a, 18c have a cross section area corresponding to that of the rod 19, in other words, they have been fitted to each other so that there is no leakage of liquid through these passages 18a,18c when the rod with normal thickness is in this passage. However, the rod 19 has been provided with a region 20 where the cross section area of the rod 19 is smaller than that of the first and third channels 18a,18c in the running spindle 3. During operation of the valve the passage 18a is opened and closed with the aid of the region 20 of the rod 19 and with the ordinary rod 19, similarly as has been described in connection with FIG. 1. The passage 18c is closed all the time, that is, the region 20 of the rod is never moved to pass through the passage 18c.

The centermost passage 18b of the first running spindle 3 is connected by a passage 30c,30d with the outer surface 3b of the running spindle 3, close to the end 3a of the running spindle 3. The centremost passage 18b communicates by this passage 30c,30d with the space in front of the spindle 3, that is with the return duct 10 and further with the tank T, when the spindle 3 is in its closing position, and it communicates with the chamber 2 and with the return duct 10 when the spindle 3 is at least in a partially open position. In the embodiment example of FIG. 6 the passage 30c,30d has been composed of a connecting passage 30c connecting the centermost passage 18b with the outer surface of the running spindle 3, and of an annular passage 30d on the surface of the running spindle 3. The annular passage 30d is, in the axial direction A—A of the running spindle, at least partially open towards the chamber 2, as can be seen in FIG. 6.

The back chamber space 2a of the first running spindle 3 is connected with the input duct by the aid of a passage 36a.

The passages 30c, 30d and 36a replace in the embodiment example of FIG. 6 the shut-off valve 31 and passages 36,30a,30b of the embodiment example of FIG. 1. Thanks to these passages the design of the valve can be simplified and the points susceptible to leakage can be made fewer in number. Moreover, the differential pressures of the chamber space 2 and of the back chamber space 2a can be utilized more efficiently than in the embodiment example of FIG. 1.

The second running spindle 4 in FIG. 1 is provided with a sleeve 80 within which the end 19b of the rod 19 has been disposed. This sleeve 80 attenuates the turbulence of flow in the chamber 2, whereby the noise level of the valve means is attenuated. The end of the sleeve 80 facing towards the chamber 2 has been shaped to be conical on the inside. This facilitates the installation of the rod 19 inside the body 1 of the valve means. It guides the end 19b of the rod to the vicinity of the pilot valve 16 of the second running spindle 4.

In conjunction with the valve means has in this embodiment example been disposed a controllable coupling means 56a, which is located outside the running spindles 3,4 and outside the chamber space 2. With the aid of this coupling means the length of the rod 19 can be regulated most advantageously within the range of two basic lengths, that is, when the coupling means is put out of action the operation of the pilot valve 14 is controlled with the aid of the electromotor 22a or equivalent, while when the coupling means is in operation the operation of the pilot valve 16 is above all controlled in the same manner as in the embodiment example of FIG. 2.

The coupling means 56a has been implemented with the aid of an electromagnetic arrangement, which has been disposed between the end face 29 of the electromotor 22a and the first end 19a of the rod 19. The magnet arrangement comprises a coil 81 and an extension piece, that is a core member, 82 or equivalent, which at least in part consists of iron or of another magnetic material. These have been disposed in connection with the body 83. The core part 82 has been movably disposed within the body 83, in the direction of the rod 19 and of the axis A—A. The coil 81 is connectable with a lead 84 to a switch (not depicted in the drawings) and further to an appropriate source of electricity. When the coil 81 is connected to an a.c. source, an electromagnetic field is produced around it, which pulls the core piece 82 into the position shown in FIG. 6, against the end piece 83a of the body.

For moving the rod 19 and the core part 82 in the direction of the axis A—A, the valve means of FIG. 6 has been provided with a similar separate actuating means as the valve means of FIG. 1. In this case the actuating means is an electric motor or, for instance, a step motor 22a. This has been attached with fixing members 24 to the valve body 1. The body 83 of the coupling means 56a has been disposed within the fixing member 24. The coupling means 56a can move in the direction of the axis A—A, carried in suitable guides.

When the coupling means 56a has been activated, that is when electricity is conducted into the coil and the core part 82 rests against the end piece 83a, the step motor 22a and the end face 29 therewith associated are used to move the whole coupling means 56a when it is desired to move the rod 19 with the aid of said step motor.

It is advantageous to provide in conjunction with the coupling means 56a a locking means, such as a lever 85. With its aid the core part 82 is locked in position against the end piece 83a of the body. The current of the coil 81 may then be switched off and the core part is still in the extreme position shown in FIG. 6. Locking of the core part 82 with the aid of the lever 85 takes place automatically when the motor 22 and the end piece 29 associated therewith have been run into the Home position, i.e., into the extreme position in the direction C, as shown in FIG. 6. When the motor 22a is run in the opposite direction B, the lever 85 falls from the upper position, which is the said locked position, into the lower position indicated with interrupted lines, in which it operates as an additional body between the core part 82 and the end face 29 when the rod 19 is being moved with the motor 22a. The core part 82 can move within the body 83 and it can be displaced against the end face 29 of the transport screw 26 when the coil 81 carries no current.

The operation of the valve means of FIG. 6 is in principle identical to that of the valve means of FIGS. 1 and 2. However, the following observations can be made regarding differences in operation. In FIG. 6, the motor is in the Home position, and the running spindle 3 has been run into the back space.

In conjunction with the motor 22a, at that position of the end face 29 associated with it, where the valve means is in so-called Home position, has been provided a microswitch 86. This switch has been disposed on a suitable shoulder in conjunction with the body 24 or equivalent. In the event of mains failure the motor 22a is run into Home position, the microswitch signalling in this position to the control unit that the motor 22a has been run into Home position. Hereafter the position of the motor 22a and of its end face 29 is known and the control actions can be carried out safely on the basis of this information.

Let us assume that the first running spindle of the valve means is in the position shown in FIG. 6. When proceeding to move the load K from location D towards the location E (FIGS. 4 and 5), one starts the pump P. The pressurized fluid pushes the check valve 53 open, and the pressure in the chamber space 2 increases. But since the return duct 10 is open, the fluid pressure cannot rise very high in the chamber 2. However, the pressure in the chamber 2 acts through the passages 30d,30c on the duct 18b and further on the rod 19 and pushes this rod against the extension piece 82, which is released at this stage, and further against the end face 29. At the same time the pressure acts through the passage 36a on the back chamber space of the running spindle 3 and pushes the running spindle towards the chamber space 2, tending to close the aperture 7. Hereby the region 20 of the rod 19 moves into register with the passage 18a, allowing the pressurized liquid to discharge from the back chamber space 2a through this passage 18a into the chamber 18b and further through 30c,30d to the return duct 10. The pressure in the back chamber space thereby decreases and the movement of the spindle 3 towards the chamber 2 slows down. The rod 19a can be moved in the direction by operating the electromotor 22a, whereby the passage 18a is closed and the spindle 3 again also moves in the direction C and tends to close the aperture 7. The first running spindle 3 ultimately closes the seat aperture 7 and the return duct 10 to the tank T. Hereafter, with the pump P further running, the running spindle 4 begins to operate exactly as in the embodiment example of FIG. 1.

Returning the piston 41 of the hydraulic cylinder S (FIGS. 4 and 5) from E to T is accomplished in principle in the same way as with the valve means of FIG. 2. Now, however, the coupling means 56 is activated, that is, the extension piece, i.e., the core part, 82 is moved with the aid of the magnetized coil 81 up against the end piece 83 of the body, whereafter the return run can be commenced.

In FIG. 4 is presented, with interrupted lines, the control apparatus for a double-acting hydraulic cylinder, in said apparatus being utilized valve means V,V' according to the invention. In this case a second valve means V' has been connected in parallel with the first valve means V, the electromotor 22' and external pilot valve 55', if any, being connected to a common control unit 52, the return duct 10' being connected to the tank T, the input duct 9' over a switching means KS to the pump P, and the working duct 11' over a passage 44' to the space 40' of the cylinder S, on the other side of the piston 41. On the first side of the piston 41 the working duct 11 of the first valve means V has been connected to the space 40 by the passage 44. The switching means KS is used to connect the pump to one or the other input duct 9 or 9', according to whether the piston 41 of the cylinder S and the load K is moved in the direction E→D or in direction D→E. In all other respects the valve means are controlled in principle similarly as has already been described in the foregoing.

The control unit advantageously comprises a suitable data processing unit, such as a microprocessor, with appropriate memory circuits. The control unit comprises interface means with the aid of which it can be connected e.g. to external data processing apparatus. The control unit may equally be implemented with any other suitable logical control units known in themselves in the art.

In the foregoing the invention has been described, referring to three advantageous embodiments thereof. It is obvious, however, that the invention may be applied in many different ways within the scope of the claims following below, and therefore the invention should not be confined to the embodiment examples here presented. The shape of the chamber space, as well as the shape of the running spindles, may equally be other than that presented above, i.e., deviating from cylindrical shape, but the constructions presented in the foregoing are advantageous in view of manufacturing techniques. The running spindles have been placed on one axis A—A in the embodiment examples presented, but they may also be placed eccentrically around one axis A—A so that their cross sections at least partly overlap in the direction of said axis, in which area the rod, or another coupling means, may be placed. The running spindles may on the other hand also be located in different parts of the chamber 2 so that they are not necessarily in direct mutual connection. The valves of the running spindles may in that case be interconnected e.g. with a mechanical coupling means consisting of a suitable linkage arrangement or of a suitable hydraulic and/or pneumatic arrangement.

The valve in connection with the first running spindle may also be implemented in that on the rod 19 is placed a suitable closing means which has a wider cross section than the rod and with the aid of which the passage 18 in the running spindle can be closed.

As was observed in the foregoing description, neither the control unit 52 nor the electromotor 22 with associated apparatus is indispensably required. The mechanical coupling means, such as a rod 19, is the connected to a suitable mechanical lever by which one may control the position of the rod 19, and naturally at the same time the operation of the hydraulic cylinder S. In that case no limit switches either are needed, nor necessarily any pulse transmitters, in connection with the hydraulic cylinder.

The controllable coupling means 56 may equally be implemented by means of a telescopic design. It is then possible to provide in conjunction with the rod a second elongated member which is pushed out from the rod 19 into operating position when one intends to exert influence on the valve 16 in the second running spindle 4. This has been implemented in the embodiment example of FIG. 6 by means of an electromagnetic arrangement. In that case the passage 70 of the external pilot valve means 55 should be connected over a suitable passage with a point in the vicinity of the aperture 17 and further by a passage provided inside the rod 19, to the space behind the piston which is extruded from the rod 19.

In the back chamber space of the first running spindle 3 a spring may be provided which replaces the valve 31 and its spring force at least partly substituting the pressure obtained from the pump P in providing a counterforce to the pressure in the chamber space 2. The arrangement of the embodiment example of FIG. 6 is however a more advantageous way. Similarly, the spring 15a in the back chamber space of the second running spindle 4 may be replaced with a valve which would connect with each other the working duct 11, or the cylinder S, and the back chamber space 2b, and the pressure in the cylinder would then be used to control the second running spindle.

What is claimed is:

1. A valve means comprising a valve body, a chamber space disposed within the valve body, two running spindles and seats disposed to cooperate and placed within said chamber space, each running spindle enabling an aperture defined in the respective seat to be controlled, and said valve means comprising an input duct, a return duct and a working duct, said ducts being connected to the chamber space, a pressurized fluid being supplied through said input duct in said chamber space and the fluid being conducted out of said chamber space through the controllable apertures by selectively positioning the running spindles to selectively direct fluid through the return duct or the working duct to at least one power cylinder, and the position of said running spindles and the size of said apertures being controlled with the aid of pilot valves, characterized in that through each running spindle has been provided a passage connecting a back chamber space behind the running spindle with the space in front of the running spindle, such as the chamber space and that in each passage have been disposed pilot valves by the aid of which the differential pressure across the running spindles is controlled and at the same time the position of the running spindles and the size of the apertures are controlled, as well as the fluid flow from the chamber space to the return duct and to the working duct.

2. Valve means according to claim 1, characterized in that the pilot valve (14) of the first running spindle (3) and the pilot valve (16) of the second running spindle (4) are interconnectable by means of a coupling means (19,56) by mediation of which both valves can be controlled with one actuating means.

3. Valve means according to claim 2, characterized in that the running spindles (3,4) are so disposed in the chamber space (2) that they are oriented according to one axis (A—A) at least so that their cross sections at least partly overlap in the direction of the axis (A—A).

4. Valve means according to claim 2, characterized in that in the body (1) is provided an aperture (17) from a first back chamber space (2a) to the outside of the body (1) and it is on the same longitudinal axis as the aperture (18) passing through the first running spindle (3), and that in the apertures (17,18) has been disposed a movable rod (19) on which has been provided longitudinally at least one region (20) at which the cross section area of the rod (19) is smaller than the cross section area of the aperture (18) in the running spindle, and said rod (19), region (20) and aperture (18) constituting the pilot valve of said first running spindle (3).

5. Valve means according to claim 4, characterized in that a mechanical coupling means (56,56a) is a member connectable in the direction of the rod (19) and as an extension to the rod (19).

6. Valve means according to claim 5, characterized in that the coupling means (56) comprises a sleeve (58) and a piston (60), said piston (60) being moved in the direction of the rod (19) with the aid of the fluid prossure in the cylinder (S) when the coupling means (56) is activated.

7. Valve means according to claim 6, characterized in that the coupling means (56) is supported with a separate body (57) on the body (1) of the valve means between the running spindles (3,4) of the chamber space (2).

8. Valve means according to claim 5, characterized in that the coupling means is an electromagnetic arrangement having a core part (86) constitutes a member connectable as an extension to the rod (19).

9. Valve means according to claim 5, wherein the coupling means comprises a sleeve and a piston, said sleeve being moveable in a direction of the run with the aid of the fluid pressure in the cylinder when the coupling means is activated.

10. Valve means according to claim 2, characterized in that the second pilot valve (16), which has been disposed in the passage (15) of the second running spindle (4; 4a), comprises a closing member (16a), a seat (16b) and a spring (16c), said seat (16b) being located in said passage (15) at the end towards the chamber space (2), and said closing member (16a) resting, urged by said spring (16c), against said seat (16b) and closes the passage (15), and the passage being openable in desired degree by acting on said closing member (16a) with a mechanical coupling means.

11. Valve means according to claim 10, characterized in that said mechanical coupling means includes said rod, wherein by movement of said rod a closing member (16a) of the second pilot valve (16) is pressed when opening of the passage (15) is desired.

12. Valve means according to claim 11, characterized in that the second running spindle (4) is provided with a sleeve (80) inside which the end (19b) of the rod (19) is disposed.

* * * * *

UNITED STATES PATENT AND TRADEMARK OFFICE
CERTIFICATE OF CORRECTION

PATENT NO. : 4,938,119

DATED : July 3, 1990

INVENTOR(S) : Pentti Rita

It is certified that error appears in the above-identified patent and that said Letters Patent is hereby corrected as shown below:

Col. 1, line 49
"inclinded" should read --inclined--

Col. 5, line 31
"and" should read --end--

Col. 7, line 63
"signals" should read --signal--

Col. 18, line 29
"prossure" should read --pressure--

Signed and Sealed this

Fourth Day of June, 1991

Attest:

HARRY F. MANBECK, JR.

Attesting Officer       Commissioner of Patents and Trademarks